Feb. 5, 1935.  C. EDINGER  1,990,116
HEADLIGHT INDICATOR
Filed Feb. 17, 1934   2 Sheets-Sheet 1
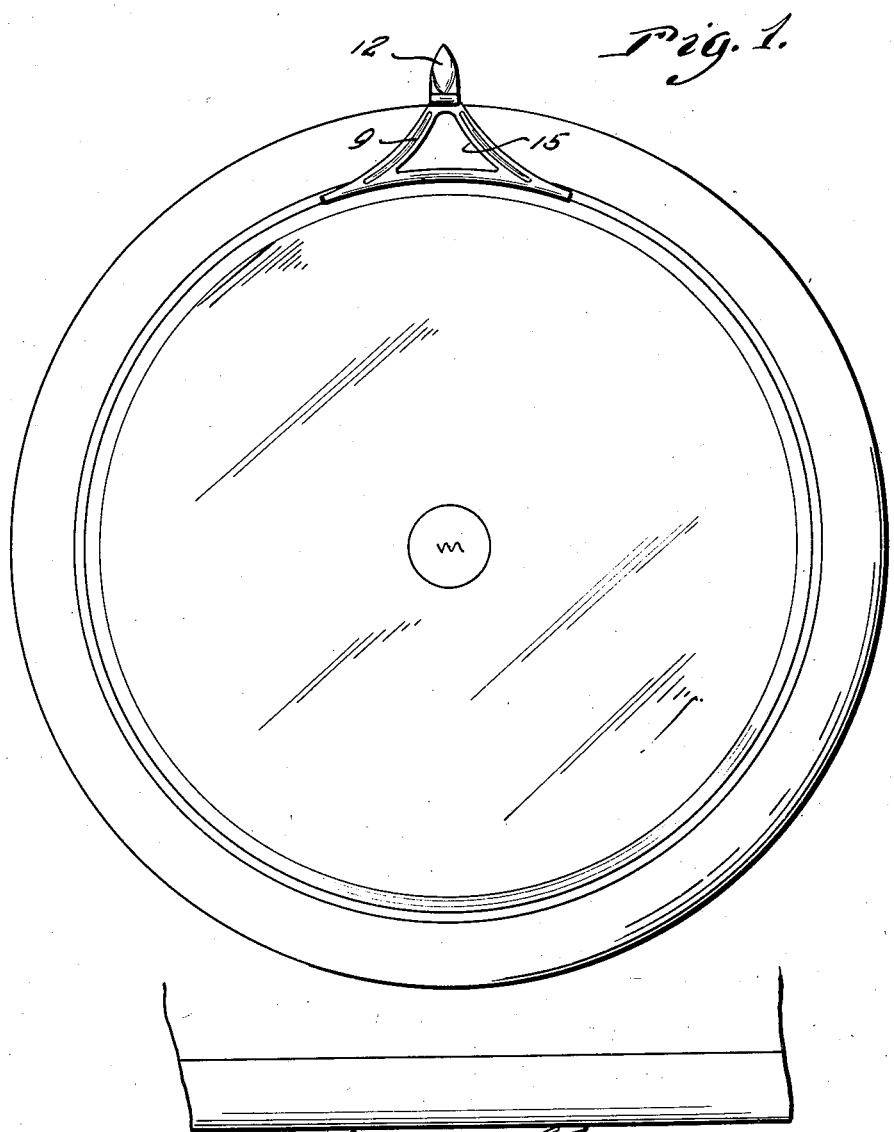
Inventor
Carl Edinger
By Clarence A. O'Brien
Attorney

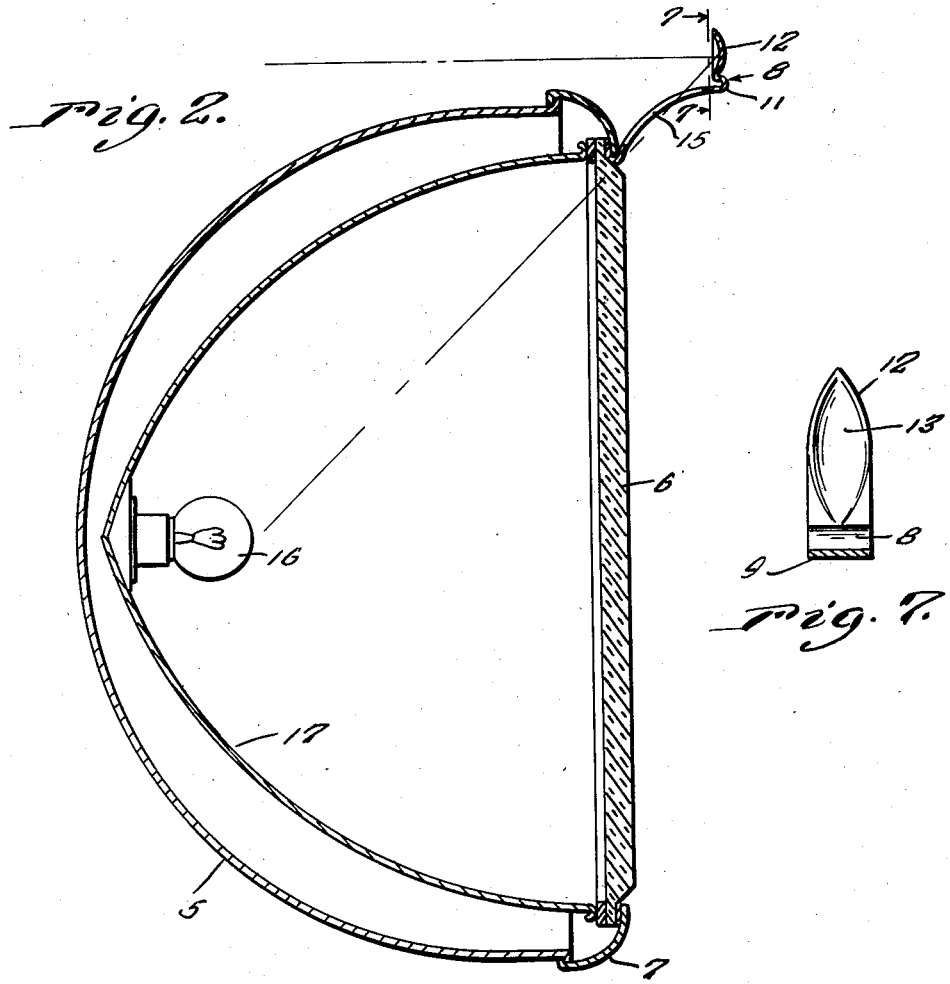
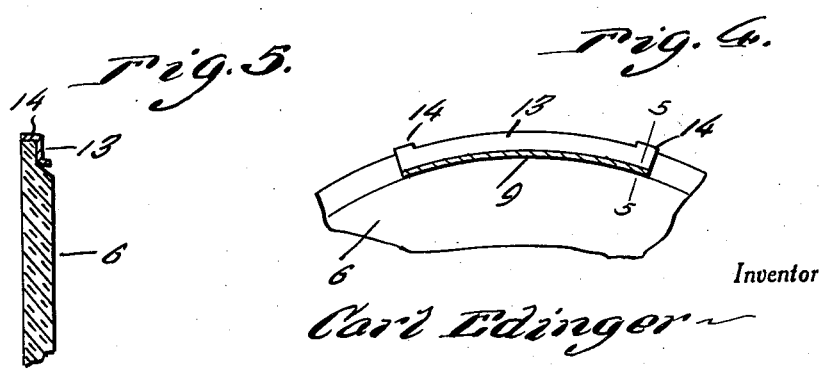

Patented Feb. 5, 1935

1,990,116

UNITED STATES PATENT OFFICE 1,990,116

HEADLIGHT INDICATOR

Carl Edinger, Racine, Wis.

Application February 17, 1934, Serial No. 711,782

1 Claim. (Cl. 240—8.4)

This invention relates to automobile headlights and more particularly to indicators therefor.

An object of this invention is to provide a cheap and easily mountable attachment for a headlight which will render it possible for the driver of the vehicle to see, without leaving his seat, whether or not either or both of his headlights are lighted, or if one of the filaments of a two filament bulb, as now generally used in headlights has burned out.

The invention together with its objects and advantages will be best understood from a study of the following description taken in connection with the accompanying drawings wherein:

Figure 1 is a front elevational view of an automobile headlight having the indicator applied thereto.

Figure 2 is a sectional view through the headlight with the indicator positioned thereon.

Figure 3 is a fragmentary top plan view of the headlight casing also illustrating the application of the invention.

Figure 4 is a fragmentary detail view illustrating the manner of engaging the indicator with the rim of the lens.

Figure 5 is a detail sectional view taken substantially on the line 5—5 of Figure 4.

Figure 6 is a detail sectional view taken substantially on the line 6—6 of Figure 3, and Figure 7 is a detail sectional view taken substantially on the line 7—7 of Figure 2.

Referring to the drawings by reference numerals it will be seen that 5 indicates generally the casing of a headlight of the type generally used on automobiles while 6 indicates the lens or transparent disk, and 7 the retaining ring or band for the lens.

The indicator is denoted by the reference numeral 8 and in the present instance is stamped from a single blank of metal cut and shaped to provide a substantially triangular shape attaching plate 9 which adjacent the corresponding edges thereof has stamped or pressed therefrom strengthening ribs 10. At the apex of the triangle the plate is extended and bent back upon itself as at 11 to provide a reinforcing and connecting web between the plate and the reflector element 12 formed integral with the part 11 of the indicator. In the present instance the reflector 12 is pressed to the shape or form shown to provide a concave reflecting surface 13 that is substantially ovate in plan, and as viewed in Figure 7.

The attaching plate 9 is curved as shown so as to extend upwardly and forwardly and at its base the plate is bent upwardly to provide a flange 13 that is adapted to fit against the front face of the lens 6 adjacent the peripheral edge of the lens as clearly shown in Figures 2, 4 and 5, and said flange 13 adjacent each end has formed integral therewith spring fingers 14 extending at substantially right angles to the flange and adapted to intimately engage the peripheral edge of the lens 6 as shown in Figure 5.

It will also be noted that the attaching plate 9 at its base is suitably curved so that the edge of the flange 13 will follow the contour of the periphery of the disk 6.

As shown in Figure 2 the flange 13 is confined between the rim of the lens 6 and the overlying portion of the retaining band or ring 7 at the upper portion of the headlight; and that the plate 9 extends upwardly and forwardly so as to position the vertically disposed reflector 12 above the top of the headlight casing so as to be clearly visible to the operator.

In actual practice the reflecting surface 13 will be highly polished while the plate 9 will be provided with a substantially triangular aperture 15.

From the above it will be apparent that rays from the light bulb 16 will pass upwardly through the aperture 15 in the plate 9 on to the reflecting surface 13 where the rays will be reflected back to the operator of the vehicle to indicate that the bulb 16 is burning.

An important feature of the present invention is the bending of the plate 9 back upon itself as at 11 as such serves to strengthen as well as to improve the looks of the indicator.

Having thus described my invention, what I claim as new is:

An indicator for vehicular headlights comprising a substantially triangular shaped plate curved on an arc extending from the base of the plate to the apex of the triangle, said plate being provided with a triangular shaped opening therein, the sides of said plate having reinforcing ribs therein, an integral flange on the base of said plate adapted to be clamped between the edge of the transparent disk of the headlamp and the retaining band of said disk, the apex portion of the triangular shaped plate being bent backwardly on itself and spaced from the plate to form a reinforcing connecting web, and an upstanding concave reflector element on the free end of said bent portion adapted to receive the light rays from the bulb of the headlight through the opening in the plate.

CARL EDINGER.